(12) United States Patent
Hirokawa

(10) Patent No.: US 10,244,132 B2
(45) Date of Patent: Mar. 26, 2019

(54) INFORMATION PROCESSING DEVICE THAT FACILITATES SETTING OF IMAGE PROCESSING AND RECORDING MEDIUM

(71) Applicant: KYOCERA Document Solutions Inc., Osaka (JP)

(72) Inventor: Osamu Hirokawa, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 0 days.

(21) Appl. No.: 15/808,166

(22) Filed: Nov. 9, 2017

(65) Prior Publication Data

US 2018/0183956 A1 Jun. 28, 2018

(30) Foreign Application Priority Data

Dec. 22, 2016 (JP) ................. 2016-248600

(51) Int. Cl.
H04N 1/00 (2006.01)
H04N 1/401 (2006.01)
H04N 1/40 (2006.01)

(52) U.S. Cl.
CPC ........... *H04N 1/00482* (2013.01); *H04N 1/40* (2013.01); *H04N 1/401* (2013.01); *H04N 1/0044* (2013.01); *H04N 2201/0094* (2013.01)

(58) Field of Classification Search
None
See application file for complete search history.

(56) References Cited

U.S. PATENT DOCUMENTS

| 2006/0242579 | A1 | 10/2006 | Mishima et al. | 715/700 |
| 2009/0303341 | A1* | 12/2009 | Mikawa | H04N 1/6027 348/222.1 |
| 2012/0120432 | A1* | 5/2012 | Hirohata | H04N 1/00474 358/1.13 |

FOREIGN PATENT DOCUMENTS

| JP | 2004-70661 A | 3/2004 |
| JP | 2006-302003 A | 11/2006 |

* cited by examiner

*Primary Examiner* — Lennin R Rodriguezgonzalez
(74) *Attorney, Agent, or Firm* — Stein IP, LLC

(57) ABSTRACT

An information processing device includes an image obtaining unit, a multiple-set-value selection unit, a set-value calculation unit, and an image-processing control unit. The image obtaining unit obtains data of an image. The multiple-set-value selection unit selects a plurality of set values relative to an item for which stepwisely variable set values are available. The item is applied to processing of the image. The set-value calculation unit calculates one set value relative to the item, based on the plurality of selected set values. The image-processing control unit applies the calculated set value to the item to control the processing of the image.

7 Claims, 5 Drawing Sheets

INFORMATION PROCESSING DEVICE THAT FACILITATES SETTING OF IMAGE PROCESSING AND RECORDING MEDIUM

INCORPORATION BY REFERENCE

This application is based upon, and claims the benefit of priority from, corresponding Japanese Patent Application No. 2016-248600 filed in the Japan Patent Office on Dec. 22, 2016, the entire contents of which are incorporated herein by reference.

BACKGROUND

Unless otherwise indicated herein, the description in this section is not prior art to the claims in this application and is not admitted to be prior art by inclusion in this section.

There is known a technique that applies a specific set value relative to items (such as resolution, shading of color, lightness, color saturation, transparency, color gradation, and sharpness) for which stepwisely variable set values are available to process an image.

SUMMARY

An information processing device according to an aspect of the disclosure includes an image obtaining unit, a multiple-set-value selection unit, a set-value calculation unit, and an image-processing control unit. The image obtaining unit obtains data of an image. The multiple-set-value selection unit selects a plurality of set values relative to an item for which stepwisely variable set values are available. The item is applied to processing of the image. The set-value calculation unit calculates one set value relative to the item, based on the plurality of selected set values. The image-processing control unit applies the calculated set value to the item to control the processing of the image.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
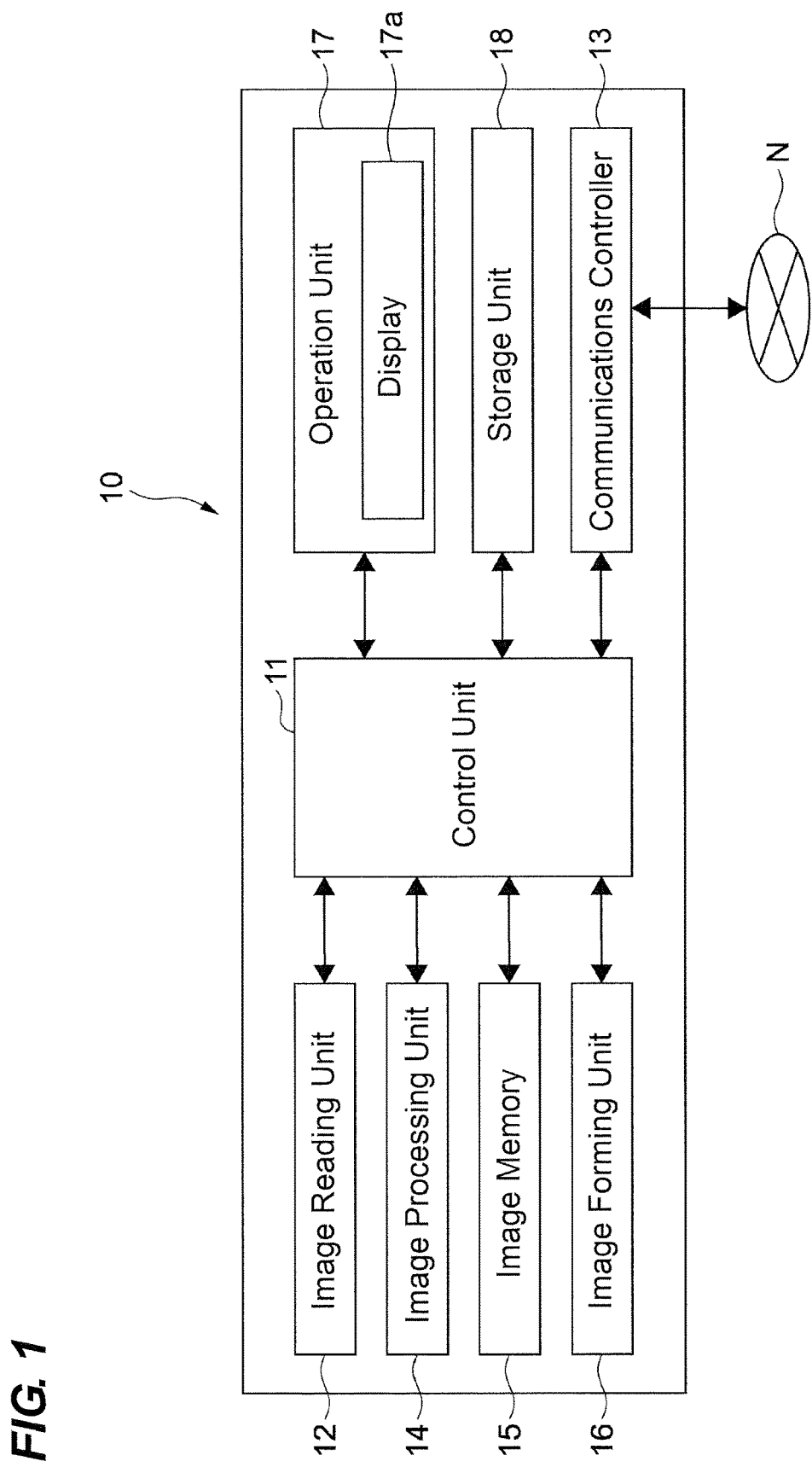
FIG. 1 illustrates a hardware configuration of an image forming apparatus according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure by referring to the accompanying drawings.

I. First Embodiment

In a first embodiment, a description will be given of an image forming apparatus (a Multifunction Peripheral, and hereinafter simply referred to as an MFP) as an example of an information processing device.

1. Hardware Configuration of Image Forming Apparatus

FIG. 1 illustrates a hardware configuration of an image forming apparatus (MFP) 10 according to the first embodiment of the disclosure.

The MFP 10 includes a control unit 11. The control unit 11 is configured of a Central Processing Unit (CPU), a Random Access Memory (RAM), a Read Only Memory (ROM), a dedicated hardware circuit, and similar component, and manages an overall operation control of the MFP 10. A computer program that causes the MFP 10 to function as respective functional units (described later) is stored in a non-transitory computer-readable storage medium such as a ROM.

The control unit 11 is connected to an image reading unit 12, an image processing unit 14, an image memory 15, an image forming unit 16, an operation unit 17, a storage unit 18, a communications controller 13 and similar unit. The control unit 11 performs the operation control of the above-described respective units, which are connected to the control unit 11, and transmits and receives signals or data to/from the respective units.

The control unit 11 controls driving and processing of a mechanism required for executing the operation control of respective functions such as a scanner function, a printing function, and a copy function, based on an execution instruction of a job entered by a user via, for example, the operation unit 17 or a personal computer (not illustrated) connected to a network.

The image reading unit 12 is a scanner that reads an image from a document.

The image processing unit 14 applies a specific set value relative to items (such as resolution, shading of color, lightness, color saturation, transparency, color gradation, sharpness) for which stepwisely variable set values are available, and processes an image. The image processing unit 14 executes image processing on image data of the image read by the image reading unit 12, as necessary. For example, the image processing unit 14 executes the image processing, such as a shading correction, to improve quality of the image, which has been read by the image reading unit 12, after image formation.

The image memory 15 has a region that temporarily stores data of a document image read and obtained by the image reading unit 12, and temporarily stores data as a print target by the image forming unit 16.

The image forming unit 16 executes image formation of the image data read by the image reading unit 12 or similar image data.

The operation unit 17 includes a touch panel unit and an operation key unit that accept an instruction on various kinds of operations and processing executable for the MFP 10 from a user. The touch panel unit includes a display 17a such as a Liquid Crystal Display (LCD) where a touch panel is located.

The communications controller 13 is an interface to connect to a network N.

The storage unit 18 is a large-capacity storage device, such as a Hard Disk Drive (HDD), that stores the document image or similar image read by the image reading unit 12.

2. Functional Configuration of Image Forming Apparatus

Figure 2:
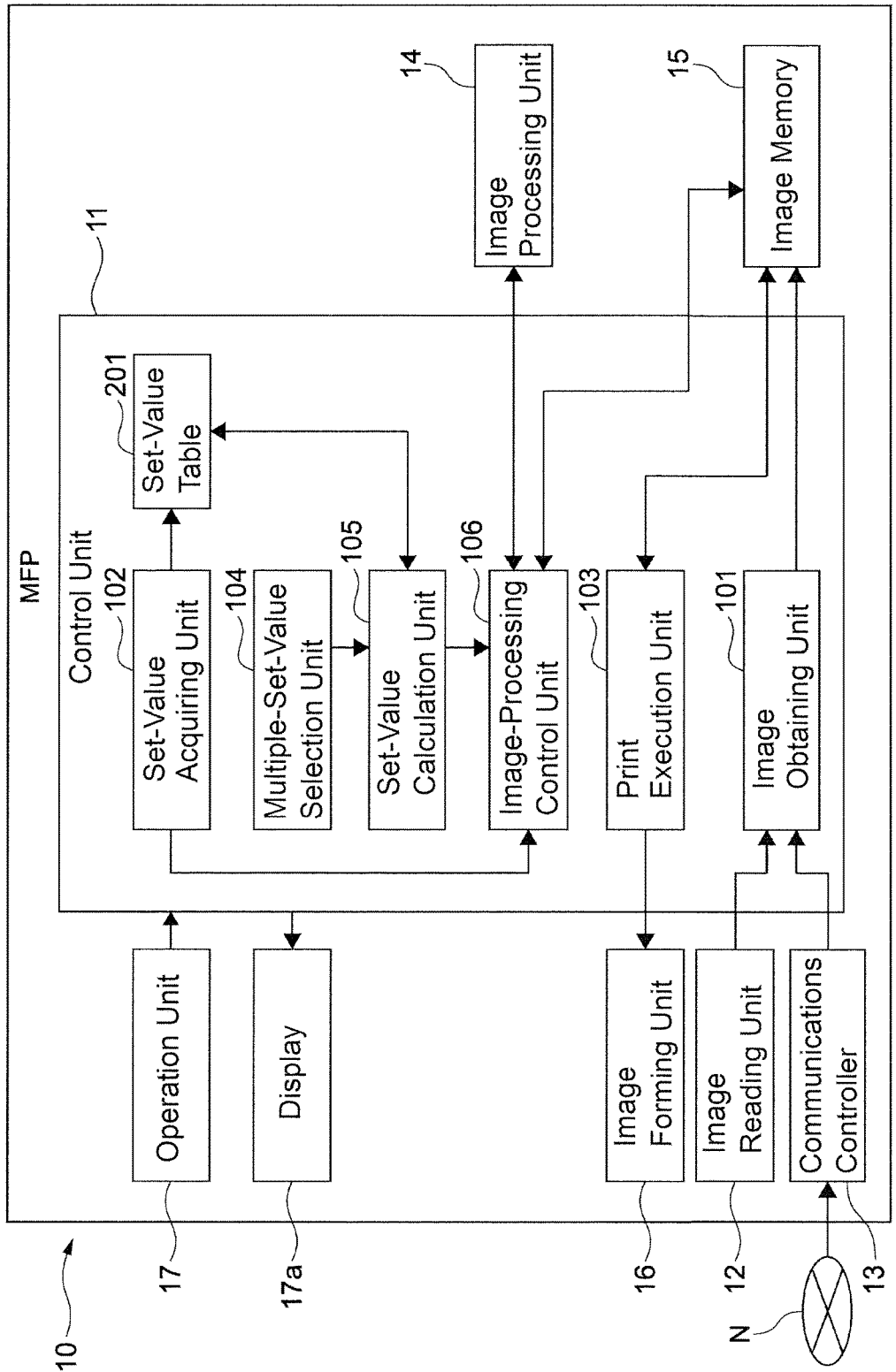
FIG. 2 illustrates a functional configuration of the image forming apparatus according to the first embodiment.

FIG. 2 illustrates a functional configuration of the image forming apparatus 10.

By loading an information processing program, which is stored in the ROM as an example of the non-transitory computer-readable storage medium, into the RAM and executing the information processing program, the MFP 10 functions as an image obtaining unit 101, a set-value acquiring unit 102, a multiple-set-value selection unit 104, a set-value calculation unit 105, an image-processing control unit 106, and a print execution unit 103.

The image obtaining unit 101 obtains data of the image, which is the print target, via the image reading unit 12 or the communications controller 13.

The set-value acquiring unit 102 acquires a specific operation to the operation unit 17 by a user as a set value relative to a respective plurality of items for which the stepwisely variable set values are available. The set-value acquiring unit 102 generates a set-value group that includes a plurality of acquired set values.

The multiple-set-value selection unit 104 selects a plurality of set-value groups. The set-value group is a group of the set values relative to the respective plurality of items that are applied to the processing of the image and for which the stepwisely variable set values are available. Thus, the multiple-set-value selection unit 104 can select the plurality of set values relative to the respective plurality of items. With this, collecting the set values relative to the respective plurality of items to handle as one set-value group enables easily selecting the set values relative to the respective plurality of items. Furthermore, the multiple-set-value selection unit 104 can also select a set value calculated by the set-value calculation unit 105 as one of the plurality of set values, and the multiple-set-value selection unit 104 can also select a set-value group including the set values calculated by the set-value calculation unit 105 as one of the plurality of set-value groups. This ensures calculating the set values that are much more likely to meet a user's ideal.

The set-value calculation unit 105 calculates the set value relative to the respective plurality of items one by one, based on the plurality of set values included in the plurality of set-value groups selected by the multiple-set-value selection unit 104.

The image-processing control unit 106 applies the set values, which are included in the set-value group, relative to the respective plurality of items to control the processing of the image by the image processing unit 14.

The print execution unit 103 outputs the processed image by the image processing unit 14 to the image forming unit 16 to print it.

3. Operational Flow of Image Forming Apparatus 10

Figure 3:
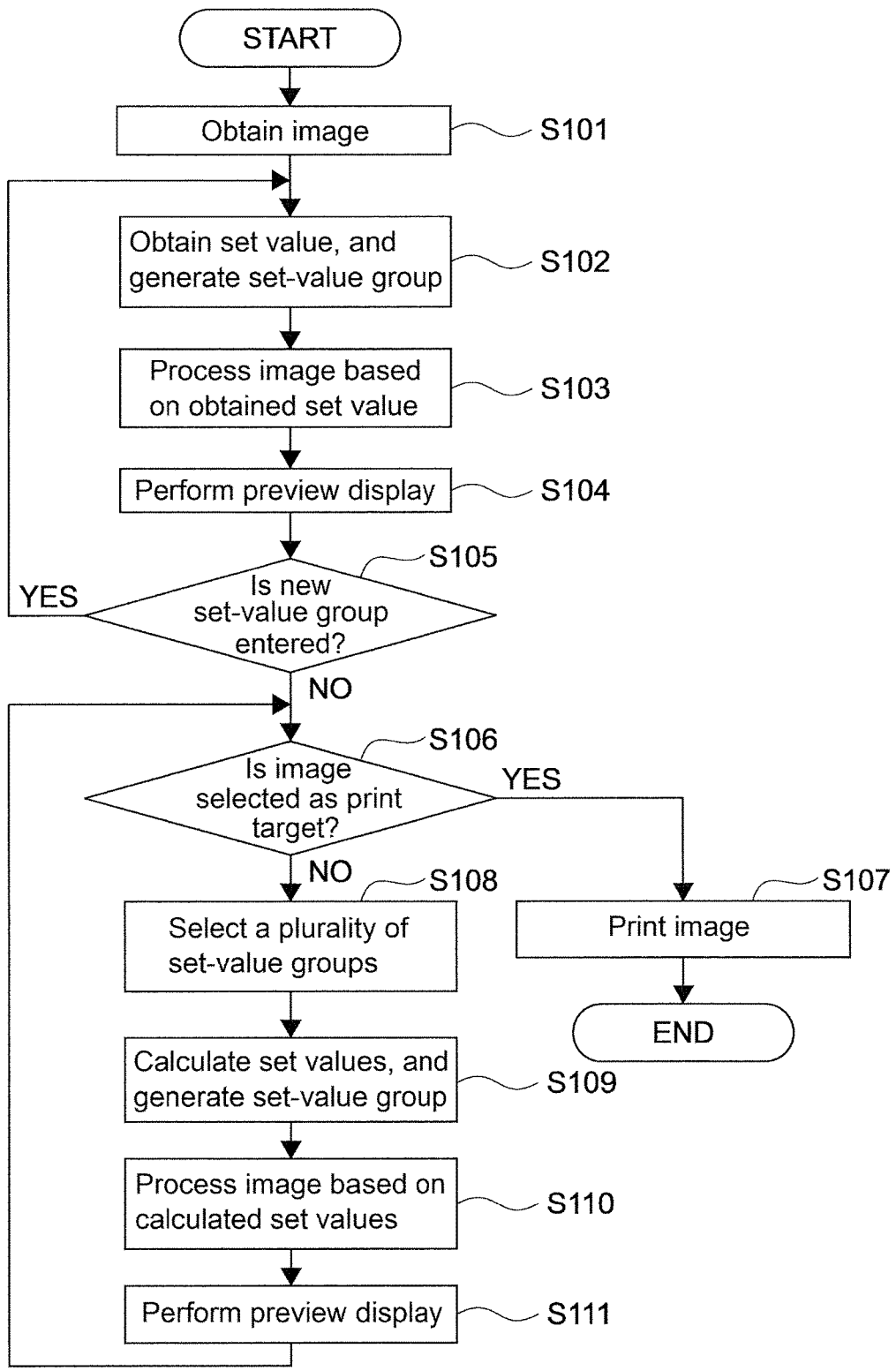
FIG. 3 illustrates an operational flow of the image forming apparatus according to the first embodiment.

FIG. 3 illustrates the operational flow of the image forming apparatus 10.

The image obtaining unit 101 obtains data of an image that the image reading unit 12 has read from a document. Alternatively, the image obtaining unit 101 obtains data of an image from an external personal computer or similar computer (not illustrated) via the communications controller 13 (Step S101). The image obtaining unit 101 causes the image memory 15 to store the data of the obtained image.

The set-value acquiring unit 102 detects the specific operation to the operation unit 17 by a user as an operation for entering a set-value group. Here, "the set-value group" is a group of set values relative to the respective plurality of items that are applied to the processing of the image and for which the stepwisely variable set values are available. Further, "the plurality of items that are applied to the processing of the image and for which the stepwisely variable set values are available" include, for example, resolution, shading of color, lightness, color saturation, transparency, color gradation, sharpness, and similar property. Furthermore, "stepwisely variable" may be variable in values of 0% to 100%, for example, in increments of 1% (a count of steps is relatively large), or may be variable in steps of 10%, 20%, or similar percentage (the count of steps is relatively small). Alternatively, "stepwisely variable" may be a selection of any value of a plurality of fixed values. These "stepwise" may be identical or different for each of the plurality of items.

The set-value acquiring unit 102 generates the set-value group that includes a plurality of set values entered to the operation unit 17 by the user (Step S102). In other words, "the set-value group" means a group of set values relative to the respective plurality of items. For example, "the set-value group" is a group that includes one set value relative to resolution, one set value relative to shading of color, one set value relative to lightness, one set value relative to color saturation, one set value relative to transparency, one set value relative to color gradation, and one set value relative to sharpness. The set-value acquiring unit 102 writes the generated set-value group into a set-value table 201 inside the RAM. In the set-value table 201, an ID that uniquely identifies the set-value group and the set values relative to the respective plurality of items are associated with one another and written. The set-value acquiring unit 102 notifies the image-processing control unit 106 of the set values, which are included in the generated set-value group, relative to the respective plurality of items.

The image-processing control unit 106 supplies the set values, which are included in the set-value group generated by the set-value acquiring unit 102, relative to the respective plurality of items to the image processing unit 14. The image-processing control unit 106 reads the image obtained by the image obtaining unit 101 from the image memory 15 to supply it to the image processing unit 14. That is, the image-processing control unit 106 applies the set values, which are included in the set-value group generated by the set-value acquiring unit 102, relative to the respective plurality of items to control the processing of the image by the image processing unit 14.

The image processing unit 14 applies the set values, which are obtained from the image-processing control unit 106, relative to the respective plurality of items to the image obtained from the image-processing control unit 106 to process the image (Step S103). The image processing unit 14 supplies the processed image to the image-processing control unit 106.

The image-processing control unit 106 associates the data of the processed image with the ID of the set-value group to cause the image memory 15 to store the data of the processed image. The image-processing control unit 106 performs a preview display of the processed image on the display 17a (Step S104).

When the user visually checks the processed image displayed in the preview display on the display 17a, and the processed image is not satisfactory for the user as a print target, the user performs the specific operation again to the operation unit 17 for entering a new set-value group. The set-value acquiring unit 102 detects the specific operation to the operation unit 17 by the user as an operation for entering the set-value group again (YES at Step S105). Then, the set-value acquiring unit 102 generates the set-value group again based on the operation to the operation unit 17 by the user. (Step S102). Subsequently, the MFP 10 executes the operations at Steps S103 and S104 again, and the image-processing control unit 106 performs the preview display of all the generated, processed images on the display 17a (Step S104). Subsequently, the MFP 10 performs a determination at Step S105 again.

When the set-value acquiring unit 102 does not detect the operation for entering the set-value group again (NO at Step S105), as a result, the processed images for the count of processing (assume N) are displayed in the preview display on the display 17a. In the set-value table 201, the N IDs of the set-value groups and the set values relative to the respective plurality of items are associated with one another and written. The image memory 15 associates the N pieces of data of the processed images with the N IDs of the set-value groups and stores them.

Assume that the user visually checks the N processed images displayed in the preview display on the display 17a and any one of the processed images is satisfactory for the user as the print target. In this case, the user performs the specific operation to the operation unit 17 for selecting and printing the processed image.

The print execution unit 103 detects the specific operation to the operation unit 17 by the user as the operation for selecting and printing any one of the processed images (YES at Step S106). Then, the print execution unit 103 reads the selected, processed image from the image memory 15 to output to the image forming unit 16 and print it (Step S107).

On the other hand, assume that there is no satisfactory image for the user as the print target among the N processed images displayed in the preview display on the display 17a. In this case, the user performs the specific operation to the operation unit 17 for selecting the plurality (namely, two or more, and the same applies to the following) of processed images (typically, the image close to an ideal process result).

The multiple-set-value selection unit 104 detects the specific operation to the operation unit 17 by the user as the operation for selecting the plurality of processed images displayed in the preview display on the display 17a. The multiple-set-value selection unit 104 selects the plurality of processed images based on the detected operation. The multiple-set-value selection unit 104 selects the plurality of set-value groups associated with the respective plurality of selected, processed images, and notifies the set-value calculation unit 105 of the IDs of the set-value groups (Step S108).

The set-value calculation unit 105 reads the set values relative to the respective plurality of items associated with the IDs of the plurality of set-value groups, which have been notified from the multiple-set-value selection unit 104, from the set-value table 201. The set-value calculation unit 105 calculates the set values relative to the respective plurality of items one by one, based on the plurality of set values included in the plurality of set-value groups, which have been selected.

A description will be given of a concrete example. When two set-value groups are selected, the set-value calculation unit 105 calculates, for example, an average value of the set value of "lightness" of the item included in the first set-value group and the set value of "lightness" of the item included in the second set-value group, as the set value of "lightness" of the item. The set-value calculation unit 105 similarly calculates the set values for all the items included in the set-value groups, other than "lightness" of the item. The set-value calculation unit 105 generates the new set-value group that includes all the calculated set values (Step S109).

The set values calculated for the respective items are not limited to the average value of the set values included in the plurality of set-value groups. The calculated set value is only necessary to be equal to or more than a minimum set value and equal to or less than a maximum set value, among the plurality of set values, which have been selected. For example, the set value may be calculated by weighting at least one set-value group, among the plurality of set-value groups, which have been selected. Alternatively, for the set values of a part of the items, the set values included in the respective set-value groups may be directly used, and for the set values of the remaining items, the values calculated by weighting the set values included in at least one set-value group may be used. Alternatively, for the set values of a part of the items, the set values included in the first set-value group may be directly used, and for the set values of the remaining items, the set values included in the second set-value group may be directly used. Alternatively, for the set values of a part of the items, the set values included in the first set-value group may be directly used, and for the set values of the remaining items, the calculated values (the average value or the calculated values weighted on one side) based on the set values included in the plurality of set-value groups may be used. When the set-value groups or the set values are weighted, a degree of weighting (for example, a weighting ratio relative to the respective plurality of set-value groups or the plurality of set values) may be accepted from the user via the operation unit 17.

The set-value calculation unit 105 writes the generated set-value group into the set-value table 201. The set-value calculation unit 105 notifies the image-processing control unit 106 of the set values, which are included in the generated set-value group, relative to the respective plurality of items.

The image-processing control unit 106 supplies the set values, which are included in the set-value group generated by the set-value calculation unit 105, relative to the respective plurality of items to the image processing unit 14. The image-processing control unit 106 reads the image obtained by the image obtaining unit 101 from the image memory 15 to supply it to the image processing unit 14. That is, the image-processing control unit 106 applies the set values, which are included in the set-value group generated by the set-value calculation unit 105, relative to the respective plurality of items to control the processing of the image by the image processing unit 14.

The image processing unit 14 applies the set values, which are obtained from the image-processing control unit 106, relative to the respective plurality of items to the image obtained from the image-processing control unit 106 to process the image (Step S110). The image processing unit 14 supplies the processed image to the image-processing control unit 106.

The image-processing control unit 106 associates the data of the processed image with the ID of the set-value group to cause the image memory 15 to store them. The image-processing control unit 106 performs the preview display of the processed image on the display 17a (Step S111) and causes the process to proceed to Step S106.

When all the set values, which are included in the set-value group generated at Step S109, of the setting items are identical to the set values that are included in the set-value group having been already generated, the set-value calculation unit 105 is not required to write the generated set-value group into the set-value table 201. In this case, the set-value calculation unit 105 may specify (for example, by blinking of the preview of the corresponding set-value group or by message display indicating that the set values are identical to the set values of the corresponding set-value group) the existing set-value group, the set values of which are determined to be identical to all the set values, which are included in the set-value groups generated at Step S109, of the setting items, on the display 17a. Then, Steps S110 and S111 are not executed, and the process proceeds to Step S106.

The user visually checks the N+1 processed images displayed in the preview display on the display 17a; when any one of the processed images is satisfactory for the user as the print target, the user performs the specific operation to the operation unit 17 for selecting and printing the processed image.

The print execution unit 103 detects the specific operation to the operation unit 17 by the user as the operation for selecting and printing any one of the processed images (YES at Step S106). Then, the print execution unit 103 reads the selected, processed image from the image memory 15 to output to the image forming unit 16 and print it (Step S107).

On the other hand, assume that there is no satisfactory image for the user as the print target among the N+1 processed images displayed in the preview display on the display 17a. In this case, the user performs the specific operation to the operation unit 17 for selecting the plurality of processed images (typically, the image close to the ideal process result). Then, the processes after Step S108 are repeated.

From the (N+1)-th time on, it is possible to select the set-value group previously generated by the set-value calculation unit 105. Since the set-value group generated by the set-value calculation unit 105 is based on the selection of the user, this ensures generating the image that is more likely to meet the user's ideal.

4. Modification

In the first embodiment, based on the set-value group that includes the set values relative to the respective plurality of items for which the stepwisely variable set values are available, the image is processed and the new set-value group is generated by calculation. Instead of this, the image may be processed and the new set value may be generated by calculation, based on the set value relative to at least one item for which the stepwisely variable set values are available. In short, it is only necessary that there is at least one item, which is applied to the processing of the image, for which the stepwisely variable set values are available.

Alternatively, based on the set values relative to the respective plurality of items for which the stepwisely variable set values are available, the image may be processed and the new set values relative to the respective plurality of items may be generated by calculation. In short, when there are the plurality of items, which are applied to the processing of the image and for which the stepwisely variable set values are available, the set values may be handled as the new set values relative to the respective plurality of independent items, instead of collectively handling as one set-value group.

In the first embodiment, the set-value acquiring unit 102 acquires the specific operation to the operation unit 17 by the user as the set values relative to the respective plurality of items for which the stepwisely variable set values are available, and generates the plurality of set-value groups that include the plurality of acquired set values. Instead of this, the set-value acquiring unit 102 may acquire the set-value groups preliminarily stored by the MFP 10 from a storage unit instead of the set-value groups by the input of the user. The set-value acquiring unit 102 may acquire a part of the set-value groups from the set-value groups through the input of the user, and may acquire the other set-value groups from the set-value groups preliminarily stored by the MFP 10.

5. Summary

In a technique that processes an image based on a set value entered by a user and selects the processed image to print, the user is required to continue confirming preview images by entering the set values many times until a satisfactory image as a print target is generated. In some cases, it is required to remember the entered set values and the preview images based on the set values; this is sometimes burdensome and time-consuming for the user.

In contrast to this, with the first embodiment, assume that there is no satisfactory image for the user as the print target among the processed images displayed in the preview display. In this case, the user selects the plurality of processed images (typically, the image close to the ideal process result). The multiple-set-value selection unit 104 selects the plurality of processed images based on the detected operation. The set-value calculation unit 105, based on the plurality of set values included in the plurality of selected set-value groups, calculates the set values for all the items included in the set-value groups to generate the new set-value group. Thus, the new set-value group is generated based on the plurality of set-value groups selected by the user, and the image is processed based on this new set-value group. This ensures generation of the image with the process result close to the user's ideal, without an additional, manual input of the set value by the user.

II. Second Embodiment

In the following second embodiment, a description of a configuration, an operation, and similar aspect similar to the configuration, the operation, and similar aspect, which have been already described, will be omitted, and a description will be mainly given of different points.

The first embodiment has been described the image forming apparatus (MFP) as one example of the information processing device. In contrast to this, in the second embodiment, a description will be given of a terminal device such as a personal computer, a tablet computer, or a smart phone, as one example of the information processing device.

1. Hardware Configuration of Terminal Device

Figure 4:
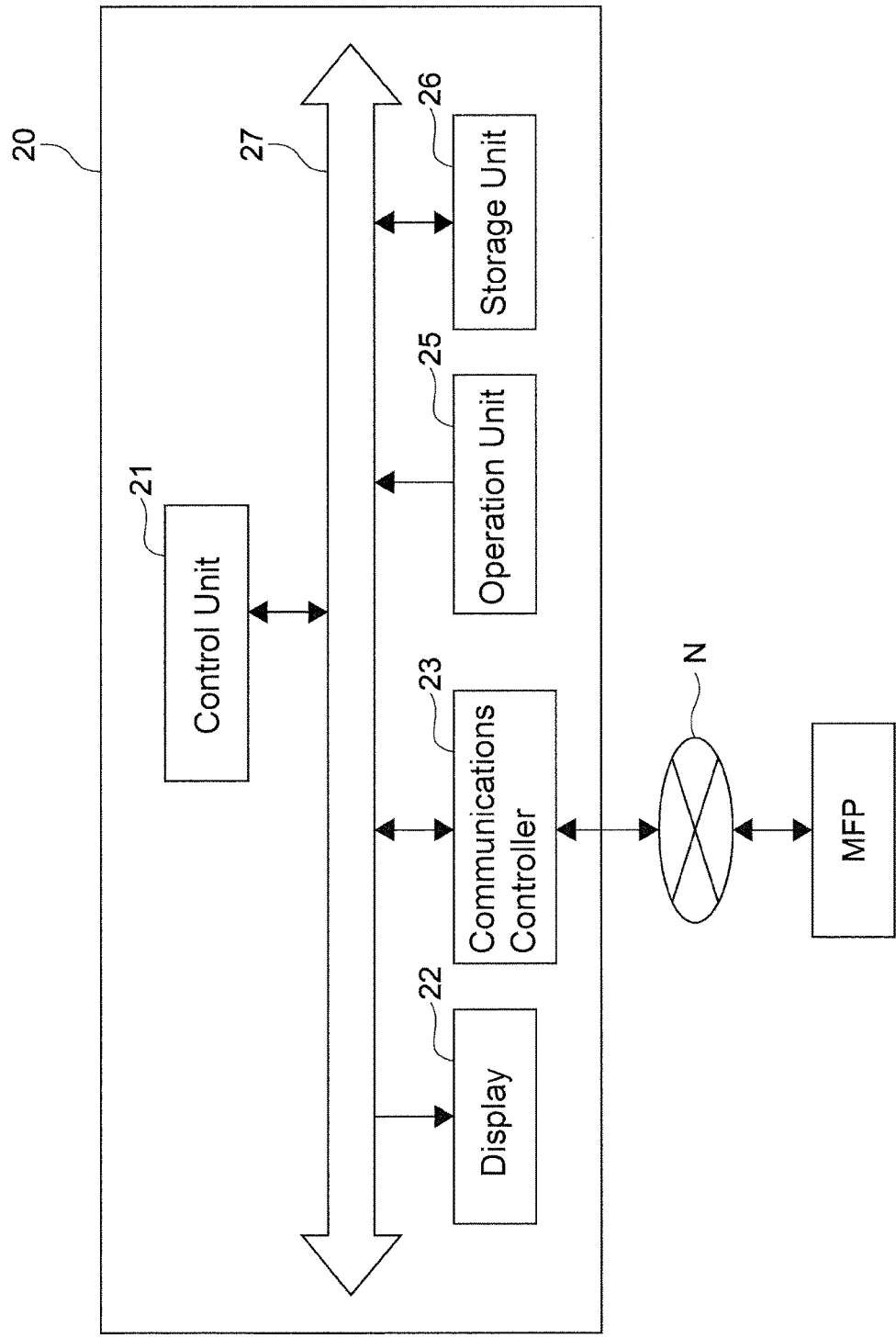
FIG. 4 illustrates a hardware configuration of a terminal device according to a second embodiment of the disclosure.

FIG. 4 illustrates a hardware configuration of a terminal device 20 according to the second embodiment of the disclosure.

The terminal device 20 includes a control unit 21, a display 22 connected to the control unit 21 via a bus 27, a communications controller 23, an operation unit 25, and a storage unit 26.

The control unit 21 includes a Central Processing Unit (CPU) and similar component. The Central Processing Unit (CPU) of the control unit 21 loads a program stored in a Read Only Memory (ROM), which is one example of a non-transitory computer-readable storage medium, to a Random Access Memory (RAM) and executes the program. One of the programs includes a printer driver. The control unit 21 drives the MFP connected via a network N, by loading the printer driver stored in the ROM, which is the one example of the non-transitory computer-readable storage medium, to the RAM and executing the printer driver.

The storage unit 26 includes a Read Only Memory (ROM), a RAM, and a large-capacity storage device such as a Hard Disk Drive (HDD). The ROM permanently stores the program, data, and similar information executed by the control unit 21. The program stored in the ROM is loaded into the RAM.

The display 22 includes a Liquid Crystal Display (LCD), an Organic electroluminescence (EL) display, or similar display. The display 22 performs arithmetic processing based on the information received from the control unit 21 and displays generated image signals on a screen. The display 22 may be an external display apparatus.

The operation unit 25 includes a keyboard, a computer mouse, various kinds of switches, and similar component. The operation unit 25 detects the operation from the user to output to the control unit 21.

The communications controller 23 is an interface to connect to the network N.

2. Functional Configuration and Operations of Terminal Device 20

Figure 5:
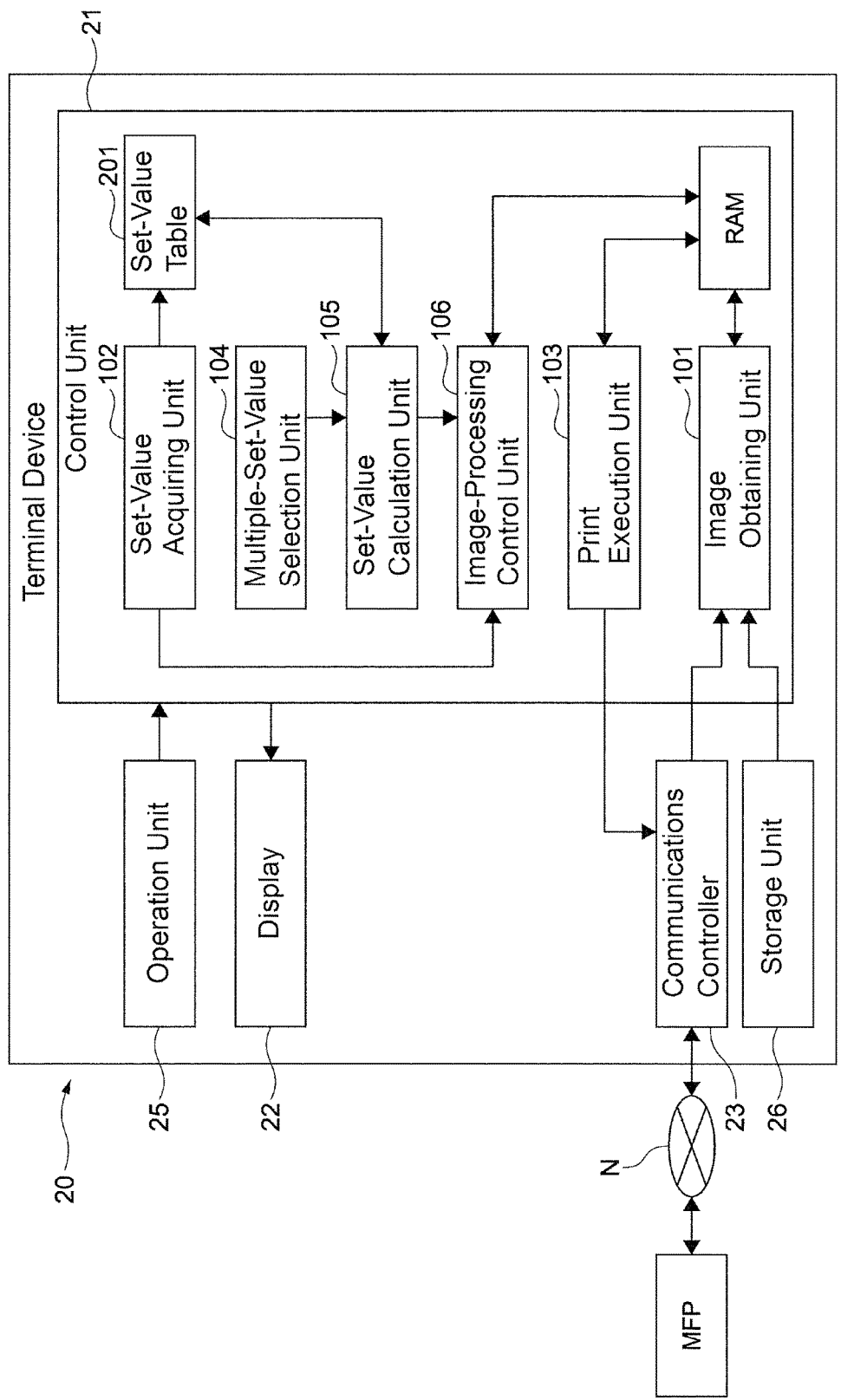
FIG. 5 illustrates a functional configuration of the terminal device according to the second embodiment.

FIG. 5 illustrates the functional configuration of the terminal device 20.

The terminal device 20 functions as the image obtaining unit 101, the set-value acquiring unit 102, the multiple-set-value selection unit 104, the set-value calculation unit 105, the image-processing control unit 106, and the print execution unit 103, by loading the information processing program (the printer driver) stored in the ROM, which is the example of the non-transitory computer-readable storage medium, to the RAM and executing the information processing program.

The functional configuration (see FIG. 5) and the operations of the terminal device 20 are similar to the functional configuration (see FIG. 2) and the operations (see FIG. 3) of the MFP 10 according to the first embodiment, except for the following points.

In the second embodiment, the CPU in the control unit 21 of the terminal device 20 executes the image processing, which is executed by the image processing unit 14 in the first embodiment. In the second embodiment, the RAM in the control unit 21 of the terminal device 20 has a function similar to the image memory 15 in the first embodiment.

In the second embodiment, the terminal device 20 does not include the image reading unit 12. The image obtaining unit 101 obtains data of an image, which is a print target, from an external device via the communications controller 13. Alternatively, the image obtaining unit 101 obtains the data of the image stored by the storage unit 26 as the print target (Step S101).

In the second embodiment, the terminal device 20 does not include the image forming unit 16. The print execution unit 103 generates print data of the image of the print target and supplies the generated print data to the MFP via the network N to print (Step S107).

3. Modification

In the second embodiment, the terminal device 20 functions as the respective function units 101 to 106, by loading the information processing program (the printer driver) stored in the ROM, which is the example of the non-transitory computer-readable storage medium, to the RAM and executing the information processing program. Instead of the printer driver, the terminal device 20 can also function as the respective function units 101 to 106 (however, except for the print execution unit 103), by loading the image processing program stored in the ROM, which is the example of the non-transitory computer-readable storage medium, to the RAM and executing the image processing program.

The second embodiment and its modification ensure obtaining effects similar to the first embodiment.

The effects described here are not necessarily limited and may be any of the effects described in the disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An information processing device comprising:
   an image obtaining unit that obtains data of an image;
   a multiple-set-value selection unit that selects a plurality of set values relative to an item for which stepwisely variable set values are available, the item being applied to processing of the image;
   a set-value calculation unit that calculates one set value relative to the item, based on the plurality of selected set values; and
   an image-processing control unit that applies the calculated set value to the item to control the processing of the image,
   wherein the set-value calculation unit calculates a value that is equal to or more than a minimum set value and is equal to or less than a maximum set value among the plurality of selected set values, as the set value, and
   wherein the set-value calculation unit calculates the set value by weighting at least one set value among the plurality of selected set values.

2. The information processing device according to claim 1,
   wherein the multiple-set-value selection unit selects the set value calculated by the set-value calculation unit as one of the plurality of set values.

3. The information processing device according to claim 1,
   wherein the information processing device is an image forming apparatus.

4. An information processing device comprising:
   a multiple-set-value selection unit that selects a plurality of set values relative to an item for which stepwisely variable set values are available, the item being applied to processing of the image;
   a set-value calculation unit that calculates one set value relative to the item, based on the plurality of selected set values; and
   an image-processing control unit that applies the calculated set value to the item to control the processing of the image,
   wherein the item includes a plurality of items,
   the multiple-set-value selection unit selects a plurality of set values relative to the respective plurality of items by selecting a plurality of set-value groups,
   the set-value group being a group of set values relative to the respective plurality of items, the set-value calculation unit calculates the set values relative to the respective plurality of items one by one, based on the plurality of set values that are included in the plurality of selected set-value groups and are selected relative to the respective plurality of items, and the image-processing control unit applies the calculated set values to the respective items to control the processing of the image.

5. The information processing device according to claim 4, wherein the multiple-set-value selection unit selects the set-value group that includes the set values calculated by the set-value calculation unit as one of the plurality of set-value groups.

6. The information processing device according to claim 4, wherein the set-value calculation unit calculates the set values relative to the respective plurality of items one by one by weighting at least one set-value group among the plurality of selected set-value groups.

7. A non-transitory computer-readable recording medium storing a program for controlling information processing device, the program causing the information processing device to operate as:

an image obtaining unit that obtains data of an image;

a multiple-set-value selection unit that selects a plurality of set values relative to an item for which stepwisely variable set values are available, the item being applied to processing of the image;

a set-value calculation unit that calculates one set value relative to the item, based on the plurality of selected set values; and an image-processing control unit that applies the calculated set value to the item to control the processing of the image, wherein the set-value calculation unit calculates a value that is equal to or more than a minimum set value and is equal to or less than a maximum set value among the plurality of selected set values, as the set value, and wherein the set-value calculation unit calculates the set value by weighting at least one set value among the plurality of selected set values.

\* \* \* \* \*